Feb. 7, 1933.  F. H. A. LÉCOLLE  1,896,905
AUTOMATIC SIGNALING DEVICE FOR MOTOR VEHICLES
Filed Feb. 14, 1929
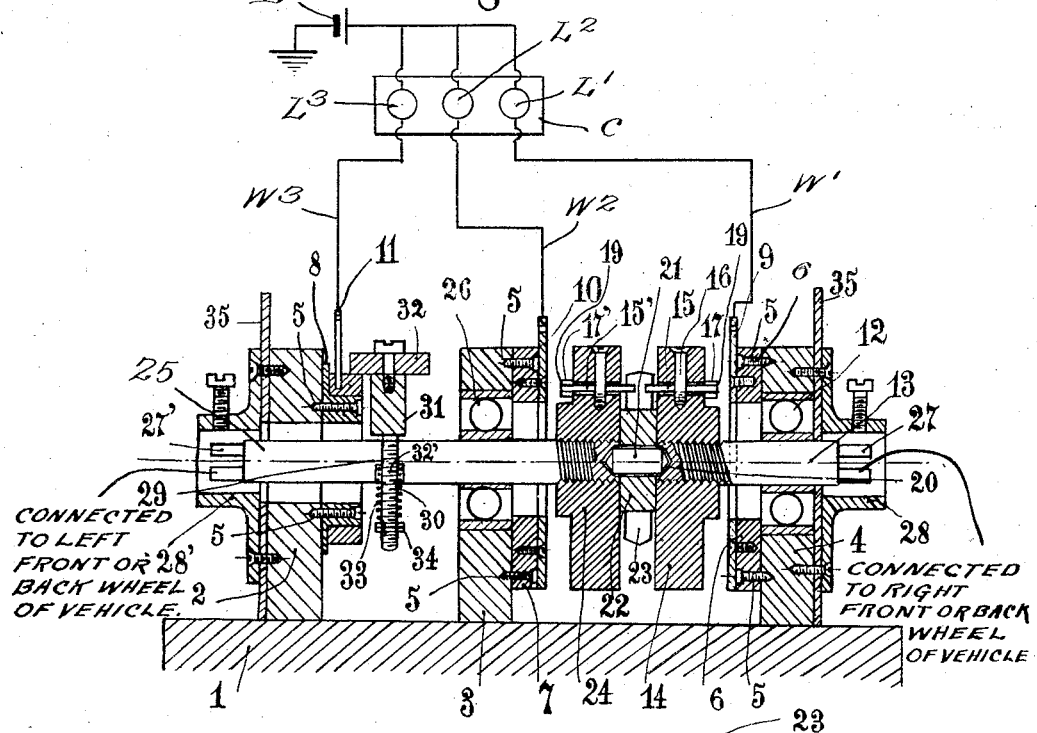
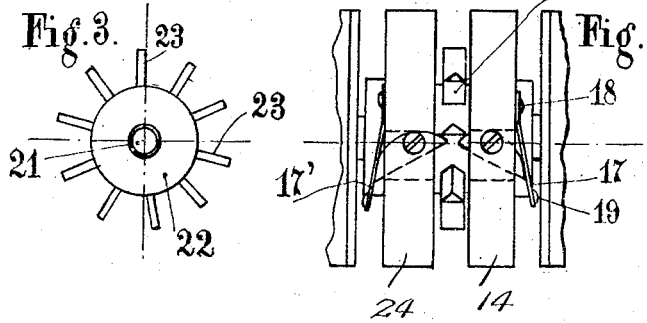
INVENTOR:
Fernand Henri Albert Lécolle
BY
ATTORNEY Patented Feb. 7, 1933

1,896,905

UNITED STATES PATENT OFFICE

FERNAND HENRI ALBERT LÉCOLLE, OF VINCENNES, FRANCE

AUTOMATIC SIGNALING DEVICE FOR MOTOR VEHICLES

Application filed February 14, 1929, Serial No. 339,848, and in France February 16, 1928.

There are available a great many apparatus carried by motor vehicles, which are adapted to indicate the various movements such vehicles are to perform.

Such apparatus as have been produced up to the present require the driver to perform a warning operation (push button contacts, levers, pedals, etc.) in order to indicate changes in direction, slowing down or stopping; and, on account of the intricacy of the apparatus, it frequently happens that some drivers forget to notify the movements they are performing or preparing to perform, or else give wrong or inaccurate indications.

This invention has for its object an apparatus whereby signaling may be effected automatically and independently of the driver's will, such apparatus making any wrong operation impossible and avoiding such accidents as might result therefrom.

The drawing appended hereto shows, by way of example, a preferred embodiment of the apparatus referred to.

Figure 1 is a longitudinal cross sectional view.

Figure 2 is a fragmentary top plan view showing the arrangement of the pawls with their return springs which, at the same time, act as contact members.

Figure 3 is a detail view showing the device whereby successive signals may be produced, which draw the attention of the drivers of the vehicles behind at the time when the vehicle provided with the signaling apparatus referred to begins to effect a change in direction.

The apparatus consists essentially of a frame 1 provided with bosses 2, 3 and 4, the number of which may be varied according to the requirements.

Secured to these bosses 2, 3 and 4, by means of countersunk screws 5, are disks 6, 7 and 8 made of an insulating material, upon which are fixed disks 9, 10 and 11 which are connected by means of conductor wires $W_1$ $W_2$ $W_3$ to a casing C provided with signaling members $L_1$ $L_2$ $L_3$ of known type.

Housed in boss 4 is a ball bearing 12 which serves as a support for a shaft 13 on one end of which there is secured a disk 14 provided at a point on its surface with a pawl 15 housed in a suitably shaped opening in which it may rotate through a certain angle about a pin 16 which serves to hold it in position.

Said pawl 15 is combined with a leaf spring 17 secured laterally at 18 on disk 14 and provided at the free end thereof with a platinized screw 19 or other suitable contact member the function of which will be explained hereinafter.

As will be understood, a plurality of pawls 15 may be provided in disk 14 without thereby departing from the scope of the invention.

Provided at the inner end of shaft 13 is a recess 20 adapted to receive the related end of an intermediate loose shaft or stud 21 on which there is mounted to rotate freely a ring 22 provided at the periphery thereof with fingers 23 in suitable number, the function of which will likewise be described hereinafter.

The end of shaft 13 projects at 27 into a bushing 28 and is provided with a slot or the like adapted to receive a connecting member (cable, rod, universal joint, etc.) upon the end of which there is secured a pulley, wheel, or pinion (not shown), mounted so as to be rotated by the brake drums or any other part of the front or rear wheels, or even by the differential gear or the rear axles.

Arranged opposite to disk 14 and symmetrically thereto is a second disk 24 keyed on the end of a shaft 25 which likewise is supported in a ball bearing 26 in boss 3. The free end 27' of said shaft projects through boss 2 and is located within a bushing 28'. Like the end 27, said end 27' is connected to a moving part of the vehicle.

Disk 24 is provided, like disk 14, with one or more pawls 15' similar to pawl 15 described above. These pawls 15 and 15' operate in reverse directions with respect to each other.

At 17' there is a leaf spring which is combined with pawl 15' and arranged symmetrically to leaf spring 17.

Formed in shaft 25 in that portion of the latter which is intermediate to bosses 2 and 3 is a hole 29 through which projects a rod 30 formed with a shoulder 31 and provided at one end thereof with a contact disk 32 adapted to revolve freely on a spindle 32'; said disk being normally pressed against the periphery of collar 11 by means of a spring 33 wound around the stem of rod 30 and bearing at one end against an abutment member 34 and at the other end against the shoulder provided in the hole 29 above mentioned. The tension of said spring may at will be adjusted by acting upon member 34. There is thus provided an automatic contactor which becomes operative under the action of centrifugal force, as will be explained hereinafter.

The unit thus constructed and assembled will preferably be enclosed in a housing (not shown) secured, for instance, on cheeks 35.

As explained above, contacts 9, 10 and 11 are connected through conductor wires to the casing C of the signaling apparatus proper, the lamps $L_1$ $L_2$ $L_3$ of which are included in the electric circuits $W_1$ $W_2$ $W_3$ to the battery B. When the circuit $W_3$ being closed, the engagement between disk or head 32 and contact 11 lights lamp $L_3$ which will indicate the operation (stopping, slowing down or change in direction) to be performed by the driver.

On the starting of the vehicle and while the speed thereof increases and the shafts 13 and 25 rotate more rapidly, when a given and variable speed is attained, the contactor 30, together with its head or disk 32 acting as a counterweight, is moved outward under the effect of the speed, thus compressing the spring 33 and breaking the circuit. The related lamp is then put out. When the car slows down, the spring 33 pulls back the contactor which, as it does not meet the same resistance, comes again into engagement with contact 11 and lights up the related lamp, thus drawing the attention of the drivers of the cars behind.

On the car beginning to turn, as the wheels on the outer side rotate with greater speed than those on the inner side, they impart through transmission means an identical rotation to each disk the swifter of which drives, through pawl or pawls 15, the loose ring 22 which in turn pushes the pawl of the opposite disk, the latter pawl being reversed with respect to the first one and acting at that time to push against spring 17 or 17' and close, by means of its platinum screw, the circuit $W_2$ by which the related signal $L_2$ is lit up. At the end of the signal, one of the fingers of ring 22 escapes the pawl, whereupon the spring 17 or 17', acting as a return device, brings back to its original position the pawl which, on being picked up again by the next finger of ring 22, pushes again the spring 17 or 17' whereby the lamp of the signal is lighted each time, this taking place during the whole time of the change in direction.

When the turning of the vehicle is completed, as both wheels of the vehicle assume the same speed, an equal movement is once more imparted to both disks 14 and 24, thus annihilating the effect of the wheels upon the pawls 17 or 17', simply because they cannot act upon ring 22 as the whole device then rotates with the same speed.

The casing C of the signaling apparatus will be constructed so that the preliminary operation light is preferably located in the middle of said casing, and the direction-change signal on the left or the right according to whether the movement takes place towards the left or the right, but any other arrangement of the lamps may be selected.

It is to be understood that the embodiment hereinabove described is by no means of any limitative character and that various desirable constructional alterations may be brought thereto without departing from the scope of the invention.

I claim:

1. A signaling device for motor vehicles, comprising two indicating members, signal circuits therefor, a pair of independently rotatable disks adapted to be driven by the wheels of the vehicle, a movable contact on each disk, a fixed contact adapted to be engaged with the movable contact to close one of the signal circuits, and means for actuating each movable contact.

2. A signaling device as set forth in claim 1, comprising a member located between the disks and having means adapted to be driven by the contact-actuating means of one disk and to drive the contact-actuating means of the other disk.

3. A signaling device as set forth in claim 1, comprising a wheel loosely mounted between the two disks and having radiating transmission members adapted to be engaged and driven by the contact-actuating means of one disk and to engage and drive the contact-actuating means of the other disk.

4. A signaling device as set forth in claim 1, comprising a third indicating member, a signal circuit therefor, and means operable by centrifugal force for closing the signal circuit.

5. A signaling device as set forth in claim 1, comprising a member located between the disks and having means adapted to be driven by the contact-actuating means of one disk and to drive the contact-actuating means of the other disk, the member comprising a wheel provided with a peripheral series of radial fingers adapted to act in succession to engage the contact-actuating means.

6. A signaling device for motor vehicles, comprising two indicating members, signal circuits therefor, a pair of independently rotatable disks adapted to be driven by the wheels of the vehicle, a spring contact carried by each disk, a fixed contact disk adjacent each rotatable disk for engaging the adjacent movable contact and thereby close one of the signal circuits, a pivoted actuating member carried by each rotatable disk in position to engage the corresponding movable contact and force it against the corresponding fixed contact disk, the two movable contacts and their actuating members being reversely arranged with respect to each other, and a member rotatable between the two rotatable disks and having means adapted to be engaged and driven by the contact-actuating means of one disk and to engage and drive the contact-actuating means of the other disk.

In testimony whereof I affix my signature.

FERNAND HENRI ALBERT LÉCOLLE.